(No Model.) 3 Sheets—Sheet 1.
H. NEHRMEYER.
PLANTER AND CULTIVATOR.
No. 516,445. Patented Mar. 13, 1894.
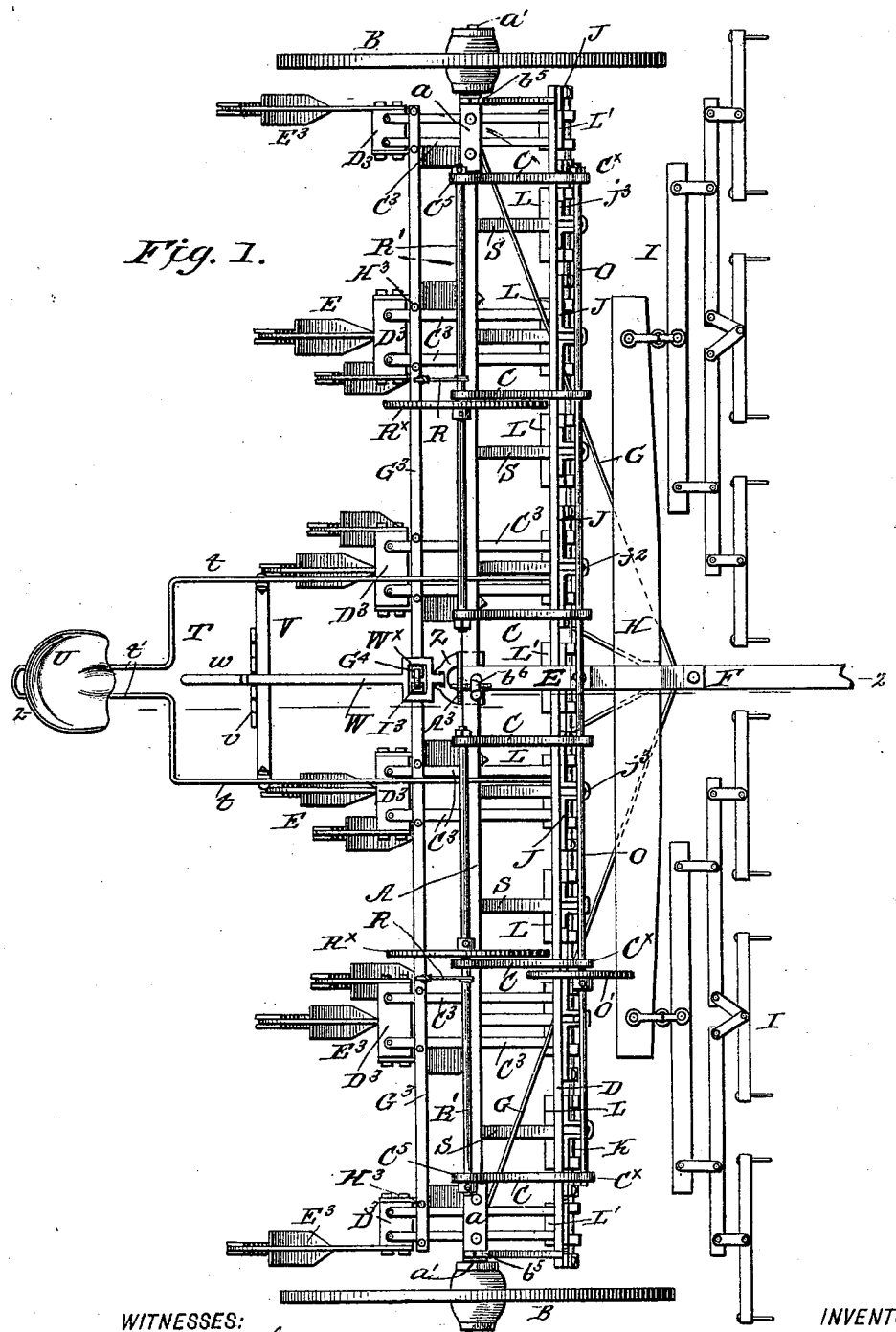
WITNESSES:
Fred G. Dieterich
M. D. Blondel
INVENTOR
Henry Nehrmeyer
BY
Munn & Co.
ATTORNEYS.

(No Model.) 3 Sheets—Sheet 2.
H. NEHRMEYER.
PLANTER AND CULTIVATOR.
No. 516,445. Patented Mar. 13, 1894.
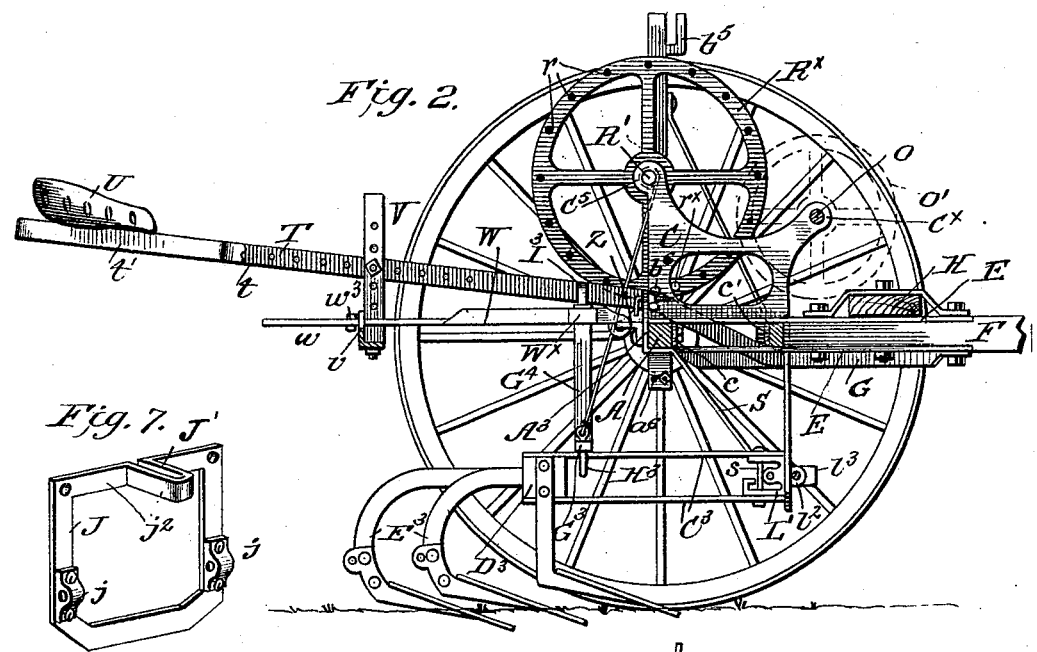
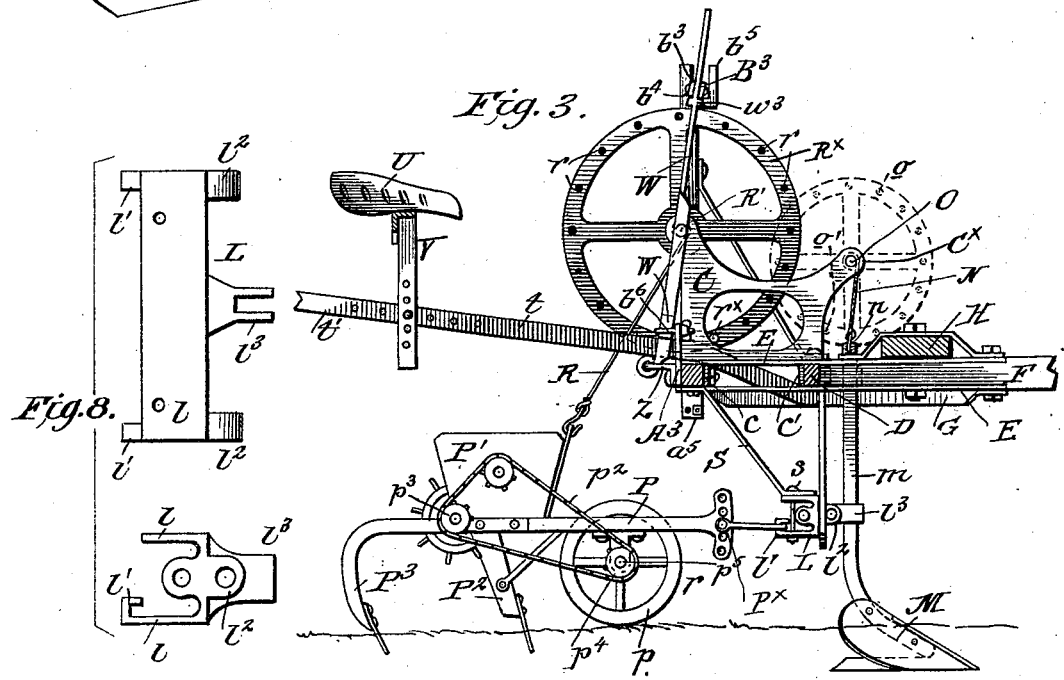
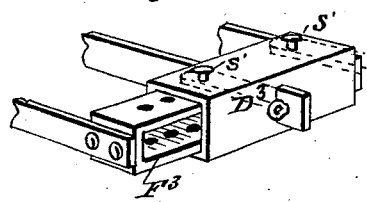
WITNESSES:
Fred G. Dieterich
M. D. Blondel
INVENTOR
Henry Nehrmeyer.
BY
ATTORNEYS.

(No Model.) 3 Sheets—Sheet 3.
H. NEHRMEYER.
PLANTER AND CULTIVATOR.
No. 516,445. Patented Mar. 13, 1894.
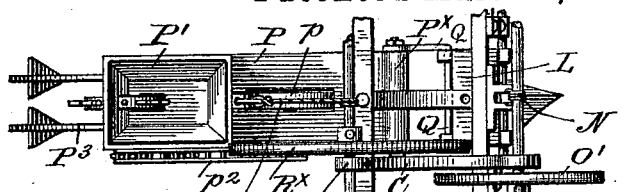
Fig. 4.
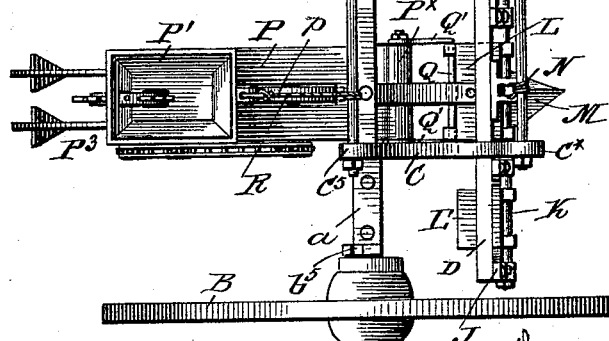
Fig. 6.
Fig. 11.
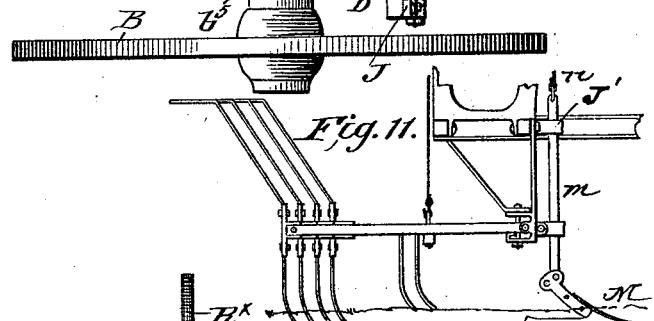
Fig. 5.
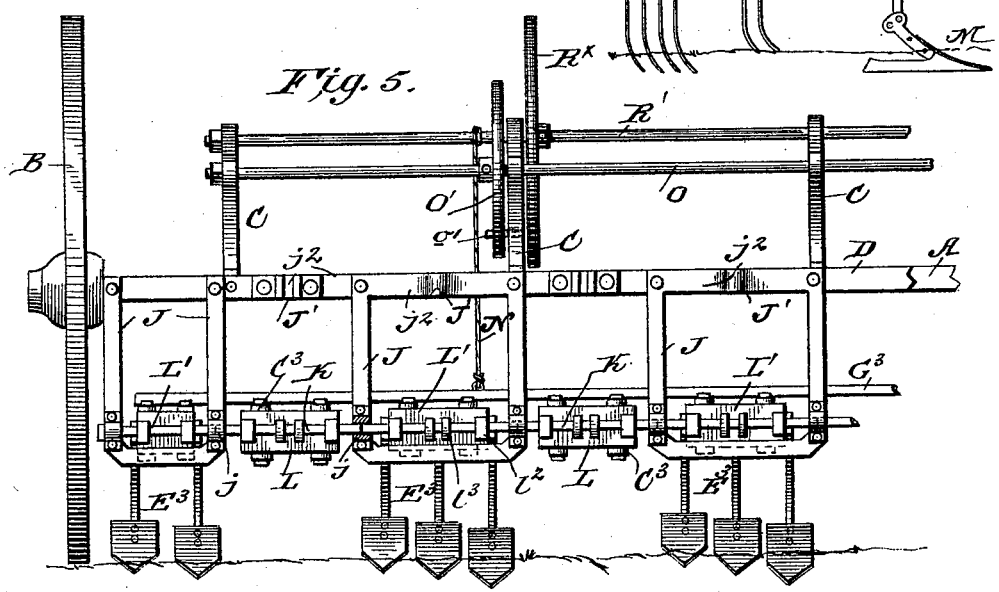
WITNESSES: Fred G. Dieterich, M. L. Blondel
INVENTOR Henry Nehrmeyer
BY Munn & Co.
ATTORNEYS.
THE NATIONAL LITHOGRAPHING COMPANY,
WASHINGTON, D. C.

UNITED STATES PATENT OFFICE.

HENRY NEHRMEYER, OF REINHARDT, TEXAS.

PLANTER AND CULTIVATOR.

SPECIFICATION forming part of Letters Patent No. 516,445, dated March 13, 1894.

Application filed June 17, 1893. Serial No. 477,934. (No model.)

*To all whom it may concern:*

Be it known that I, HENRY NEHRMEYER, residing at Reinhardt, in the county of Dallas and State of Texas, have invented a new and Improved Cotton Planter and Cultivator, of which the following is a specification.

My invention relates to that class of agricultural machines in which a main supporting frame is provided, with which is adapted to be interchangeably connected, the various implements used for the several different kinds of work, such as the planting, the cultivating and stalk cutter devices, and to these ends my invention has for its object, to provide a machine of this character, which will effectively and economically serve for its intended purposes, without being complicated or clumsy or difficult to manipulate.

It has also for its object to provide a machine which will plant or cultivate three, five or seven or more rows at one time with the aid of but one operator.

With other objects in view all of which will hereinafter be referred to, the invention consists in the peculiar combination and novel arrangement of parts, all of which will be first described and then particularly pointed out in the claims, reference being had to the accompanying drawings, in which—

Figure 1 is a top plan view of my improved machine, the cultivating attachments being shown connected with the main frame. Fig. 2 is a vertical longitudinal section of the same on the line 2—2 of Fig. 1. Fig. 3 is a vertical longitudinal section with the planting devices attached to the main frame, the cultivator plows being removed. Fig. 4 is a partial plan view of the main frame and the planting devices. Fig. 5 is a partial front view of the machine with the cultivating attachments applied. Fig. 6 is a detail perspective view of the yoke casting secured centrally on the axle. Fig. 7 is a detail perspective view of one of the yoke frames hereinafter referred to. Fig. 8 is a plan and edge view of one of the clip boxes L. Fig. 9 is a perspective view of one of the cultivator beam adjustable connecting boxes. Fig. 10 is a detail view hereinafter referred to, and Fig. 11 is a detail view illustrating the sweep plows in connection with the frame.

In the practical construction of my invention I provide a frame preferably of such width as to embrace the space of five plant rows, which frame consists of the axle A, at the ends of which are secured cuff like castings $a\ a$ which have stub axles $a'\ a'$ to receive the supporting or drive wheels B B. Projected vertically from the axle is a series of skeleton frames C, which have clamp portions $c$ at their rear ends, whereby they are secured to the said axle A and clamp members $c'$ at their front end, to which is secured a bar D, which extends transversely across the machine in front of and parallel with the axle A as clearly shown in Fig. 1.

E E indicate clamp plates secured at the center of the axle, and projected over and secured to the bar D, their front ends forming a socket like bearing to receive the rear end of the tongue F, which end abuts the bar E, as shown, the tongue F being further braced by the diagonal brace bars G G secured at their outer ends to the under side of the axle cuffs $a\ a$, and at their inner ends to the under side of the tongue.

H indicates the single tree secured to the tongue to which are secured at each end the triple trees I which are arranged in a manner clearly shown in Fig. 1 of the drawings.

By referring now more particularly to Fig. 5 of the drawings it will be noticed that to the front bar D is secured a series of depending inverted yoke like frames J, provided near their lower ends on their side arms with bearing boxes $j$ in which boxes is held a rod K which rod it should be stated forms the front connecting member to receive the several implements presently referred to, and for conveniently removing any portion of such rod in case of breakage or wear, I form it of sections, the ends of which abut and seat in the bearings $j$.

Between each pair of yoke frames J is secured upon the rod K, a connecting member L, and between the arms of each of such yoke frames is secured a similar member L', which members, are however adapted to be alternately used, *i. e.*, when the planting attachments are employed, they are connected with the boxes L, but when the cultivator attachments are used, they are connected with the boxes L', so that the cultivator plows go in between the rows made by the planter. These boxes, one of which is shown in detail in Fig. 8, consists of elongated parallel horizontal members $l$, the rear ends of the lower member of which have upturned ears $l'$, and at the corners of the front face are formed eyes $l^2$ through which the rods K pass, such rods also passing through an apertured bifurcated lug $l^3$ projected centrally from the front face of member $l$ as shown.

When the planter devices are used, a sweep or furrow opener plow M is arranged to travel in front of each of such planter devices; and such plows have vertical standards $m$ which are guided at their lower ends in the bifurcated lugs $l^3$ on the boxes L, while their upper ends are held in guides $J'$ formed on the upper cross bars $j^2$ of the yoke frames J. These plows M are held for vertical adjustment, and for such purpose are connected to flexible connections N, having hook members $n$ at one end, while their opposite ends are adapted to be wound on a shaft O, journaled in ear portions $c^\times$ on the front end of the frames C; and such shaft has a hand wheel $O'$ formed with a series of apertures $o$ in its rim, through which is adapted to be inserted a key or pin $o'$ which engages one of the frames C, see Fig. 5, and holds the wheel $O'$ and shaft O from reverse rotation when adjusted to lock same from movement. By the aforesaid arrangement of parts it will be readily understood that by winding up the shaft O, the furrow plows M can be adjusted to cut the furrow the desired depth.

As before stated to each of the blocks L is adapted to be secured a planter device which may be of any desired construction but preferably as shown, in the drawings, such construction comprising a frame P mounted on the supporting wheel $p$, a seed box $P'$ mounted on the frame, and opening and covering plows $P^2$ $P^3$ secured to the frame as shown.

Within the seed box is located a suitable agitator device which is driven by a belt $p^2$, which passes over a sprocket wheel $p^3$ on the seed wheel shaft and a sprocket wheel $p^4$ on the drive shaft $p^5$.

The frame P is of a width equal to that of the length of the connecting block L, and to hold such frame steady, and from lateral movement, without the necessity of employing an operator to guide it, I form the front end of such frame with a clevis portion $P^\times$ which is bolted to the arms $Q'$ $Q'$ of a hinged link Q, which has a hinge connection with the hook ends $l'$ of the block L as shown, in Fig. 4 and to provide additional braces and guides for such planter frames, I connect to the rear ends thereof lift chains R, which are adapted to be wound about a pair of shafts $R'$ which are mounted in bearing portions $c^5$ on the rear ends of the frames C, which shafts have hand wheels $R^\times$ the rims of which have apertures $r$, through any one of which is adapted to pass a key $r^\times$ which is adapted to engage the frame section C to hold the wheels $R^\times$ to their wound up positions when desired.

To hold the several blocks L L' from vertical and lateral movement, brace bars S are provided, a pair of which are bolted at their lower end to the top of such blocks, while their upper ends are bolted to the under side of the axle as clearly shown in Fig. 3.

T indicates a rearwardly extending frame section which consists of the side arms $t\ t$, secured at their forward ends under the front bar D and rest on the axles, their outer or near ends being bent toward each other as at $t'\ t'$ and then outward to form a support for the seat U, when the cultivator devices are used in connection with the frame. At this point it should be stated that when using the cultivator devices, a ⊔ shaped support V is secured to the side arms $t\ t$ for vertical and longitudinal adjustment thereon and with its transverse member extended below such arms, which member has a rack portion $v$ to receive the handle portion $w$ of an operating lever W. This operating lever has a hinged connection at its front end in an eye plate Z, secured to an arched member $A^3$, the particular construction of which is most clearly shown in Fig. 6 of the drawings, by reference to which it will be seen that the lower ends of its side arms $a^3$ pass under the axle and have an upwardly extending portion $a^4$ which fits over the inner face of the axle as shown, the lower end of such member also has a depending portion $a^5$, through which pass in opposite directions brace rods $a^6$, which are bolted to such portions and the under face of the cuff members $a'$ as clearly shown in Fig. 10 of the drawings.

The lever W which will hereinafter be more fully described, serves, when the machine is used for planting, as the inner support for a marker bar $B^3$ see Fig. 3 which bar has an upper slotted end $b^3$ which fits over the shouldered end $w^3$ of the lever and is pivotally connected thereto by a coupling pin $b^4$, the outer end of such marker is adapted to be supported in slotted standards $b^5$ projected up from the axle A at its opposite ends, and to securely hold the lever W to its vertical position it is clamped by a hook member $b^6$ on the arch member $A^3$ as shown in Figs. 1 and 6.

When using the planter devices the ⊔ shaped support V is turned to an inverted position (see Fig. 3) and on such support is secured the seat U, such seat being moved forward during such operation to equalize the weight on the axle.

So far as described it will be readily seen that by attaching a series of planter devices, and furrow opener plows in the manner stated, five rows can be planted at one time, and owing to the peculiar connection of the planters with the frame they will serve to travel in parallel rows, and as each planter is capable of independent vertical movement, it is adapted to travel over irregular or uneven ground.

When it is desired to thin out the plants to bring them to what is called a "stand," the sweeps M are disconnected from the blocks L and fitted to the blocks L', the plow portions being adjusted to leave the proper "stand" as they cut between the rows and weed out the superfluous plants. These sweeps, it should be stated are used alone in case it is desired to bring the plants to what is known as a stand.

In cases where a thin crop or uneven growth of plants is obtained additional finger or weeding plows are used, which plows consists of a series of gangs, arranged as shown in the diagram view Fig. 11. When however such additional plows are used an operator for each gang is required. In this construction the plows in each gang are independently pivoted at their front end to the boxes L, whereby their rear ends are capable of being lifted, such construction being provided, so that while the front sweeps will clear the bulk of loose plants and trash between the intended stands, the gang or finger plows will be drawn along close over the row or stand portions and as they pass along, such one of the plows as would engage the "stand" is lifted by the operator to clear it as it passes thereby.

As the detail construction of the gang plows and their peculiar connection with the main frame, forms the subject matter of a separate application filed June 16, 1893, Serial No. 477,862, further description thereof is here deemed unnecessary.

The cultivating devices consist of a series of supporting frames, each pivotally connected at its front end with the main frame, whereby their rear ends can be lifted vertically and held each from independent lateral movement, but for movement laterally together.

Referring now more particularly to Figs. 1 and 2, it will be seen each cultivator section, consists of an upper and lower set of horizontal bars $C^3$ $C^3$, the front ends of which are secured to the plates $l$ $l$ of the boxes L', by the bolts $s$ the brace bars S being released from such boxes L' when the cultivator frames are attached thereto. The rear ends of the bars $C^3$ $C^3$ are connected to a box $D^3$ to which the cultivator beams $E^3$ are attached as most clearly shown in Figs. 1 and 2 by reference to which it will be noticed that while the end attachments have two plows, the intermediate sets are each equipped with three plows.

To provide for cultivating close up or away from the row or stand, I connect the inner or adjacent plows of the several sets, to adjustable slide plates $F^3$, the construction and arrangement of which is most clearly illustrated in Fig. 9 of the drawings, such plates have a series of perforations, and are fitted in recesses or pockets in the boxes $D^3$ and are held to their adjusted positions by one of the bolts $s'$. By this construction it will be apparent the several plow sections can be quickly adjusted to cultivate as close to the row as desired.

To hold the several cultivator sections from independent lateral movement to make them travel in parallel lines the several sets at each side of the center of frame, are connected by bars $G^3$ $G^3$, the connection being made by clip bolts $H^3$, which pass through the bars $G^3$ extend down at the outside of the upper horizontal bars $G^3$ and down some distance under such bars as shown in Fig. 2, thus it will be seen that the several cultivator sets are joined to move laterally together, each set is capable of an independent vertical movement to accommodate itself to the unevenness of the ground. It being observed that by connecting the three sections at each side in the manner shown such sections are also capable of moving laterally. The inner ends of the bars $G^3$ are bent upward at $G^4$ as shown in Figs. 1 and 2 and pass through a bail portion $W^\times$ of the lever W which embraces them when adjusted down to the position shown in Fig. 1, and to allow such bars to have independent movement, they are guided and held together by the ∩ bail piece $I^3$ which seats in the socket ends $G^4$ of the said bars; one end $i$ of such bail piece being pointed to the more readily slip in place as the bars move vertically upward. It will be noticed that when the lever W is to the position shown in Fig. 1, its free end seats in the rack bar of the ⊔ shaped frame, and the seat at this time being at the rear of the frame section T.

In operation when it is desired to use the cultivator devices the operator, after crossing the rows and making the first set of hills or blocks, uses one of such transverse rows as his guide, and as the several sections are all uniformly arranged, it follows, that as the machine moves along and the driver, selects one row as his guide and gages the corresponding cultivator section to follow its course, by shifting the lever to the right or left, all of the cultivator sections will move parallel and in the same awry or sinuous path.

From the foregoing description taken in connection with the drawings, the complete operation and the advantages of my invention will readily appear. It will be noticed that by my peculiar construction of the main frame, I am enabled to attach thereto a series of planters, which will automatically operate to plant the seed in regular and uniform rows, without the necessity of employing a hand for guiding them.

Having thus described my invention, what I claim as new, and desire to secure by Letters Patent, is—

1. In a combined planter and cultivator machine, in combination with the main frame constructed to interchangeably carry the planting or cultivating devices, marker standards at the sides of the main frame, of a lever pivoted to the axle adapted to form means for shifting the cultivator shovels when in one position, and to form a vertical standard to receive the pivot end of the marker bar when at its elevated position, and the marker bar adapted to be detachably connected to such lever standard and supported at its ends in the fixed standards all substantially as and for the purposes described.

2. In a planting and cultivating machine, substantially as described the combination with the main frame, an arched bracket secured to the rear end of the axle, having a rearwardly extended eye or pivot member, of the lever pivoted at its inner end to such eye member, and adapted when raised vertically to rest against the arched bracket, a securing bail or bolt on such arched frame to hold the lever to its vertical position, said lever having a bearing portion at its free end adapted to form a pivot support for a marker bar, substantially as and for the purposes described.

3. In a planting and cultivating machine, the combination with the main frame, including the axle and the front cross bar, the depending yoke like sections, having connecting boxes secured thereto and constructed to form interchangeably the front connections for the planting and cultivator attachments, said boxes having guides on their front faces, of the furrow opener plows, held for vertical adjustment in the guides on the connecting boxes, frames projected vertically from the axle and front cross bar, formed with bearing members at their front and rear ends, winding shafts journaled in such ends, having operating hand wheels and the flexible connections secured to such shafts, the front connections adapted to be detachably secured to the furrow plow standards and the rear connections adapted to be detachably connected to the planter or cultivator attachments all arranged substantially as shown and for the purposes described.

4. In a planting and cultivating machine, the combination with the main frame, said frame having a series of depending front members, a hinge bar or rod journaled on such members, and the boxes journaled at their front ends to such bar or rod, of a series of cultivator gangs connected to the boxes, the transverse bars connecting the rear ends of the gangs at each side of the frame, the inner ends of such bars bent upward, the guide connections between such ends and the shifting lever pivoted to the main frame and having a bail portion adapted to fit over the upward bent ends of the gang connecting bars all substantially as and for the purposes described.

5. In a planting and cultivating machine, the combination with the main frame, the cultivating attachments, pivotally connected at their front end to the main frame whereby their rear ends are adapted to swing vertically, and the cross bars connecting the plow gangs formed with vertical projecting portions, of the rearwardly extending frame, having a seat bearing at its rear end, its front end connected to the main frame, a ⊔ shaped support having a rack member adjustably secured between the side arms of the rearwardly extending frame section, and a lever pivoted at its front end to the main frame, formed with a bail portion adapted to embrace the upwardly extending members of the cultivator gang connecting bars, the rear end of such lever being arranged to engage the rack portion of the frame all substantially as shown and described.

6. In a combined planting and cultivating machine essentially as described, the combination with the main frame, having depending front frame sections, a transverse rod journaled therein, of the connecting boxes, connected to such rod, said boxes having front apertured ears, and upper and lower rearwardly extending apertured top plates, the lower plates having hook members, all arranged substantially as shown whereby such boxes will form means for interchangeably connecting the planter or the cultivating attachments to the main frame, as and for the purposes set forth.

7. In a combined planter and cultivator, the combination with the main frame, the marker supports projected up from the axle, the cultivator gangs, and the bars connecting such gangs to move them together, such bars having vertically extended members, of a lever pivoted at its inner end to the axle to swing upward, provided with a loop portion adapted to engage the vertical members of the gang connecting bars, and apertured at its free end, a guide member secured on the main frame arranged to support the lever when turned to its vertical position and the marker bar, adapted to be pivotally connected at its inner end to the upper end of the said lever, and to rest in one of the marker supports all arranged substantially as shown and described.

HENRY NEHRMEYER.

Witnesses:
FRED G. DIETERICH,
SOLON C. KEMON.